(12) United States Patent
Witter et al.

(10) Patent No.: US 9,241,007 B1
(45) Date of Patent: Jan. 19, 2016

(54) SYSTEM, METHOD, AND COMPUTER PROGRAM FOR PROVIDING A VULNERABILITY ASSESSMENT OF A NETWORK OF INDUSTRIAL AUTOMATION DEVICES

(71) Applicant: Blue Pillar, Inc., Indianapolis, IN (US)

(72) Inventors: Bradley Jay Witter, Carmel, IN (US); Kyle Patrick Zeronik, Carmel, IN (US)

(73) Assignee: Blue Pillar, Inc., Indianapolis, IN (US)

( * ) Notice: Subject to any disclaimer, the term of this patent is extended or adjusted under 35 U.S.C. 154(b) by 4 days.

(21) Appl. No.: 13/945,812

(22) Filed: Jul. 18, 2013

(51) Int. Cl.
  *H04L 29/06* (2006.01)
  *H04L 12/28* (2006.01)
(52) U.S. Cl.
  CPC ........... *H04L 63/1433* (2013.01); *H04L 12/281* (2013.01)
(58) Field of Classification Search
  CPC .......................... H04L 12/281; H04L 63/1433
  USPC ............................................ 726/25; 709/222
  See application file for complete search history.

(56) References Cited

U.S. PATENT DOCUMENTS

| | | | | |
|---|---|---|---|---|
| 2005/0222820 | A1* | 10/2005 | Chung | 702/188 |
| 2009/0287803 | A1* | 11/2009 | McQuillan et al. | 709/222 |
| 2010/0070782 | A1* | 3/2010 | Majewski et al. | 713/310 |

OTHER PUBLICATIONS

Goraj, M. et al.; "Recent developments in standards and industry solutions for cyber security and secure remote access to electrical substations"; Developments in Power Systems Protection, 2012. DPSP 2012. 11th International Conference on Year: 2012 pp. 1-8, DOI: 10.1049/cp.2012.0064.*
Dong-Joo Kang; et al.; "Analysis on cyber threats to SCADA systems"; Transmission & Distribution Conference & Exposition: Asia and Pacific, 2009 Year: 2009 pp. 1-4, DOI: 10.1109/TD-ASIA.2009.5357008.*

* cited by examiner

*Primary Examiner* — Hadi Armouche
*Assistant Examiner* — Angela Holmes
(74) *Attorney, Agent, or Firm* — Lessani Law Group, PC

(57) ABSTRACT

A system, method, and computer program are provided for providing a vulnerability assessment of a network of industrial automation devices. A user interface that enables a user to select an IP address range and a plurality of industrial automation protocols is provided. The system attempts to establish a communication session with each device within the selected IP address range using each of the selected industrial automation protocols. If a communication session is established with a device, the system attempts to read device information. If device information can be read, the system determines a threat level associated with the device using the device information. The system then provides a vulnerability assessment to the user, identifying each device with which a communication session was established and the industrial automation protocol(s) with which the communication session was established and any threat level determined for the device.

11 Claims, 10 Drawing Sheets

SYSTEM, METHOD, AND COMPUTER PROGRAM FOR PROVIDING A VULNERABILITY ASSESSMENT OF A NETWORK OF INDUSTRIAL AUTOMATION DEVICES

BACKGROUND OF THE INVENTION

1. Field of the Invention

This invention relates generally to a vulnerability assessment system and, more particularly, to a system and method for providing a vulnerability assessment of a network of industrial automation devices.

2. Description of the Background Art

Industrial automation devices, such as diesel generators, fuel cells, lighting systems, chillers, pumps, boilers, manufacturing equipment, automatic transfer switches, etc., may be connected together on a network so that they can be centrally monitored and managed. For example, a hospital may need to monitor its power supply and energy consumption to ensure that it has adequate power for all the equipment in the hospital. Similarly, an industrial manufacturing facility may network its equipment so that it can monitor its power supply and consumption to ensure that energy is used efficiently.

While being able to centrally monitor and manage such devices is becoming increasingly necessary for energy management and other purposes, the problem with connecting such devices to a network is that they become vulnerable to attack. If a device can be remotely accessed, the device can also be remotely controlled. For example, another party with a harmful intent would be able to disrupt power to a hospital, airport, or other critical facility.

Therefore, there is a need to be able to assess the vulnerability of networked industrial automation devices. There are known network intrusion detection tools that detect vulnerabilities using the TCP/IP protocol. These tools are used to detect vulnerabilities of office and personal computing devices such as laptops, desktops, printers, servers, etc.

However, industrial automation devices may run firmware or other software that communicates via one or more industrial automation protocols such as Modbus, BACnet, OPC, etc. A network of industrial automation devices may use a number of different industrial automation protocols. A TCP/IP port associated with one protocol may be secure while a TCP/IP port associated with another protocol may not be secure. Therefore, there is a need for a tool that can assess the vulnerability of a network of industrial automation devices with respect to several different industrial automation protocols.

SUMMARY OF THE INVENTION

The present invention is directed to a system, method, and computer program for providing a vulnerability assessment of a network of industrial automation devices. The method includes providing a user interface that enables a user to select an IP address range and a plurality of industrial automation protocols (e.g., Modbus, BACNet, OPC, OPC UA, SNMP, DMP, and Tridum Jace) with respect to which the vulnerability assessment will be performed. The system attempts to establish a communication session with each device within the selected IP address range, where an attempt is made using each of the selected industrial automation protocols. In response to being able to establish a communication session with a device, the system attempts to read the manufacturer and model information from the device. In response to reading the manufacturer and model information from the device, the system determines a threat level associated with the device using the manufacturer and model information. The system then provides a vulnerability assessment to the user, where the vulnerability assessment identifies each device with which a communication session was established and, for each identified device, the industrial automation protocol(s) with which the communication session was established and any threat level determined for the device.

In certain embodiments, when the system attempts to establish a communication session with a device, TCP/IP port information associated with one of the selected industrial automation protocols is retrieved. The system attempts to establish a TCP/IP connection with the TCP/IP port associated with the one industrial automation protocol. In response to establishing a TCP/IP connection with the TCP/IP port, the system attempts to establish a communication session via the one industrial automation protocol. In the preferred embodiment, these steps are repeated for each of the selected industrial automation protocols.

In certain embodiments, in response to establishing a communication session with a device via one of the industrial automation protocols, the system then determines whether any sub-devices to the device are detected. This is because some industrial automation devices are connected to a network via a gateway or industrial control system. In response to detecting one or more sub-devices, the system attempts to establish a communication session with each of the detected sub-devices using the same industrial automation protocol. In response to establishing a communication session with a sub-device, the system reads information related to the manufacturer and model of the sub-device from the sub-device, determines a threat level associated with the sub-device using the manufacturer and model information, and includes the sub-device in the threat assessment.

In certain embodiments, determining a threat level for a device includes mapping each of a plurality of industrial automation devices with a threat level and storing the mapping in a data store. In response to reading manufacturer and model information from a device, the system then looks up the device in the mapping, and, in response to finding the device in the mapping, retrieves the threat level associated with the device.

In certain embodiments, the vulnerability assessment is uploaded to the data store. The system then determines if the vulnerability assessment includes a new device that is not in the mapping. In response to the vulnerability assessment including a new device, the new device is flagged for review and addition to the mapping. Upon receiving a threat level associated with the new device, the system then updates the mapping to include the new device and the associated threat level.

DETAILED DESCRIPTION OF THE PREFERRED EMBODIMENTS

The present invention is directed to a system, method, and computer program for providing a vulnerability assessment of a network of industrial automation devices. As used herein, "industrial automation devices" may include industrial automation equipment, industrial energy devices, building automation systems, gateways to the foregoing, and industrial control systems (e.g., SCADA systems).

Examples of industrial automation devices include industrial power generation devices (e.g., a diesel generator, solar panel, fuel cell, uninterruptable power supply, wind turbine, etc.), industrial power consumption devices (e.g., chillers, pumps, boilers, lighting systems, etc.), electrical switching equipment (e.g., automatic transfer switch), and/or utility meters and submeters.

Figure 1:
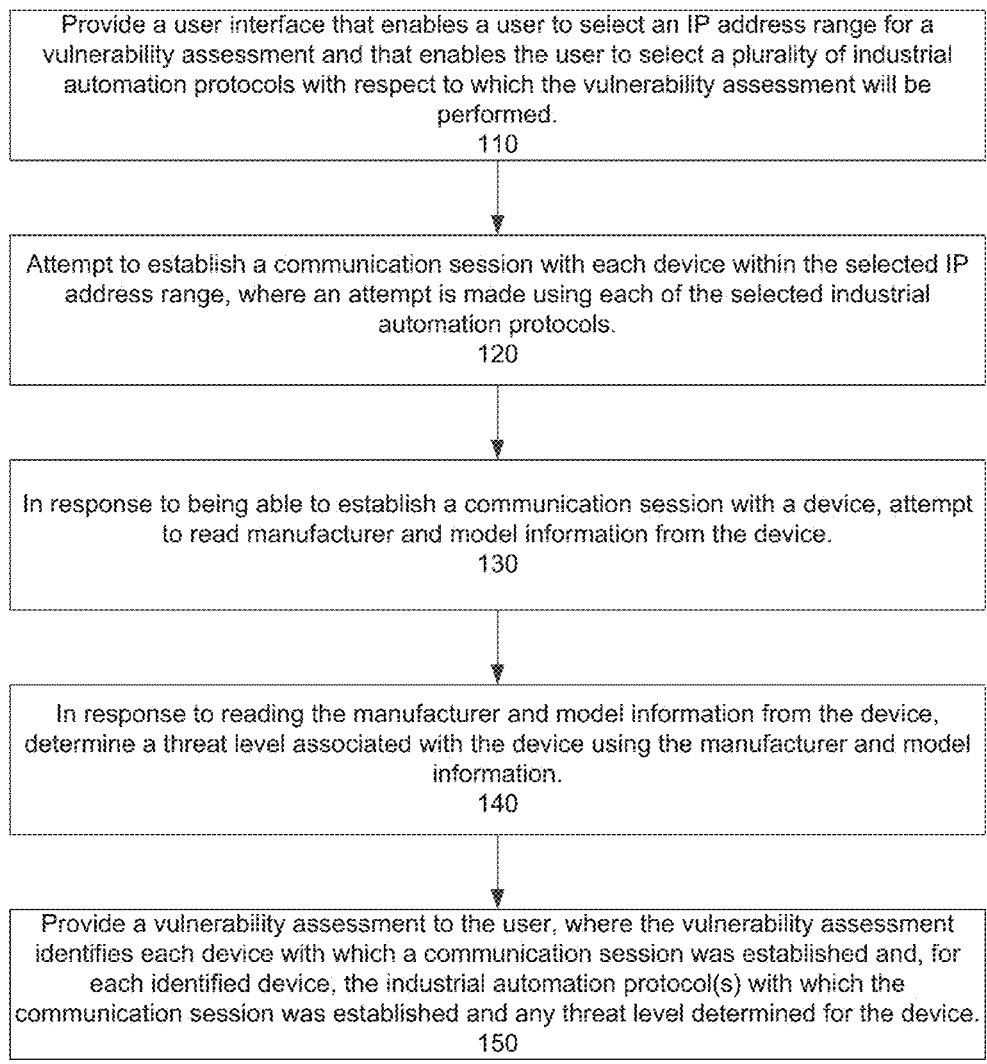
FIG. 1 is a flowchart that illustrates a method, according to one embodiment of the invention, for providing a vulnerability assessment of a network of industrial automation devices.

As seen in FIG. 1, the system provides a user interface that enables a user to select an IP address range for a vulnerability assessment and that enables the user to select a plurality of industrial automation protocols (e.g., Modbus, BACNet, OPC, OPC UA, SNMP, DMP, and Tridum Jace) with respect to which the vulnerability assessment will be performed (step 110). The system then attempts to establish a communication session with each device within the selected IP address range, where, for each device, an attempt is made using each of the selected industrial automation protocols (step 120).

In certain embodiments, establishing a communication session with a device via an industrial automation protocol involves first identifying the TCP/IP port number associated with the industrial automation protocol. For example, the TCP/IP port number associated with the Modbus protocol is 502, whereas the TCP/IP port number associated with the OPC protocol is 135. The system attempts to establish a TCP/IP connection with the identified TCP/IP port. In response to establishing a TCP/IP connection with the TCP/IP port, the system attempts to establish a communication session using the industrial automation protocol. For each device within the specified IP address range, this is repeated for each industrial automation protocol.

In response to being able to establish a communication session with a device, the system attempts to read the manufacturer and model information from the device (step 130). Different devices may be associated with different threat levels. In other words, the security of certain devices is more critical than others. In response to reading the manufacturer and model information from the device, a threat level associated with the device is determined using the manufacturer and model information (step 140).

In certain embodiments, determining a threat level for a device includes mapping each of a plurality of industrial automation devices with a threat level and storing the mapping in a data store. In one embodiment, any industrial automation device that control of would enable one to disrupt power to a facility is mapped to the highest threat level. Devices that may store critical facility data, but cannot be used to significantly control power to a facility, may be associated with a medium threat level. Devices that cannot be used to control a facility and have only non-critical data may be associated with a lowest vulnerability level.

The mapping may be stored in a local data store or in a remote data store. In response to reading manufacturer and model information from a device, the system then looks up the device in the mapping, and, in response to finding the device in the mapping, retrieves the threat level associated with the device.

A vulnerability assessment is then provided to the user, where the vulnerability assessment identifies each device with which a communication session was established and, for each identified device, the industrial automation protocol(s) with which the communication session was established and any threat level determined for the device (step 150). In certain embodiments, any unsecured devices are classified by threat level in the threat assessment. In other embodiments, any unsecured devices are classified by vulnerability type (i.e., industrial automation protocol) in the threat assessment.

In certain embodiments, the vulnerability assessment is uploaded to the data store. The system then determines if the vulnerability assessment includes a new device that is not in the mapping. In response to the vulnerability assessment including a new device, the new device is flagged for review and addition to the mapping. Upon receiving a threat level associated with the new device, the system then updates the mapping to include the new device and the associated threat level.

In certain embodiments, in response to establishing a communication session with a device via one of the industrial automation protocols, the system then determines whether any sub-devices to the device are detected. In response to detecting one or more sub-devices, the system attempts to establish a communication session with each detected sub-device using the same industrial automation protocol. In response to establishing a communication session with a sub-device, the system reads information related to the manufacturer and model of the sub-device from the sub-device, determines a threat level associated with the sub-device using the manufacturer and model information, and includes the sub-device in the threat assessment.

The methods described with respect to FIGS. 1 and 3a-5b are embodied in software and performed by a computer system (comprising one or more computing devices) executing the software. A person skilled in the art would understand that a computer system has one or more memory units or other physical, computer-readable storage media for storing software instructions and one or more processors for executing the software instructions.

Figure 2:
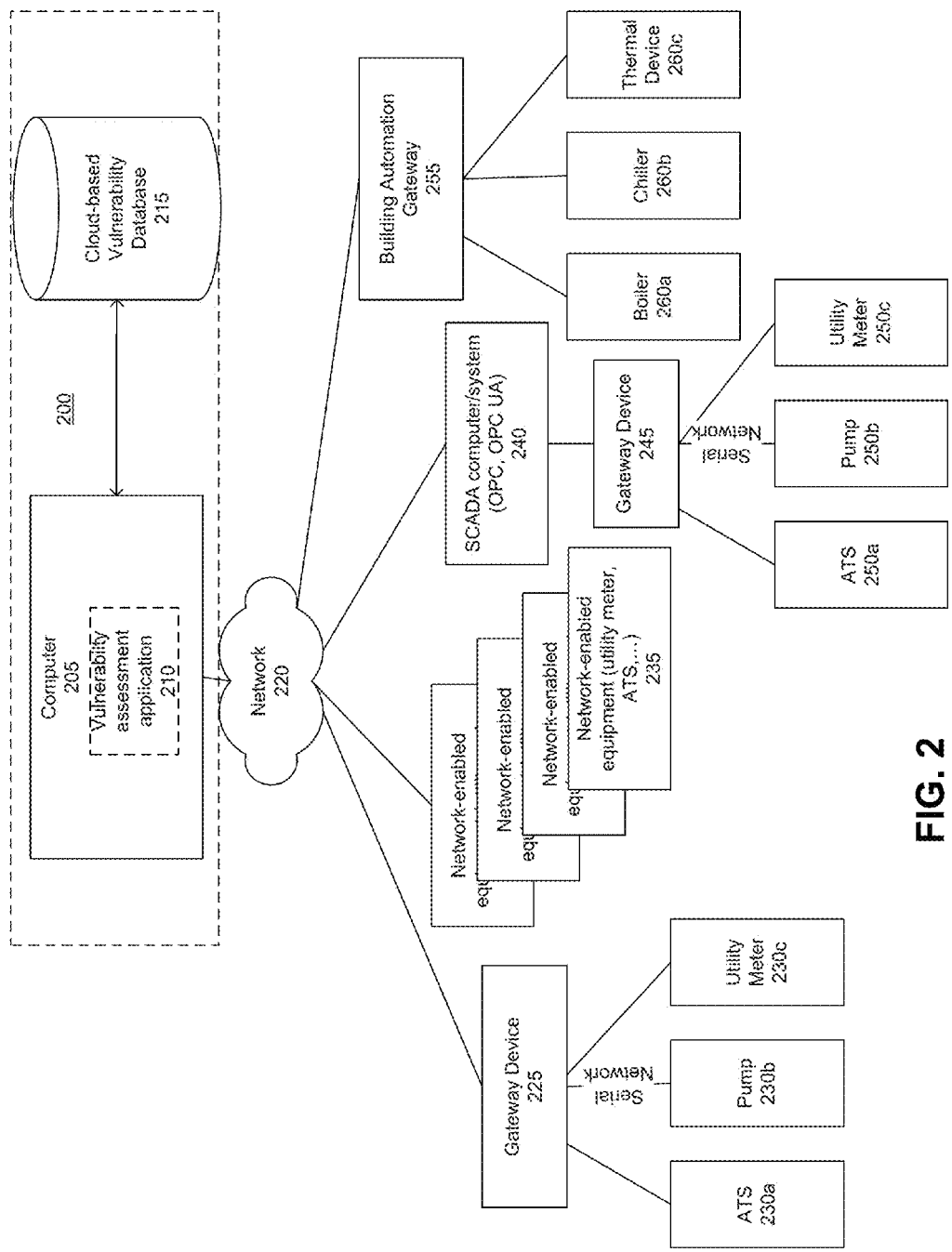
FIG. 2 is a diagram of a network of industrial automation devices connected to a vulnerability assessment system according to one embodiment of the invention.
Figure 3A:
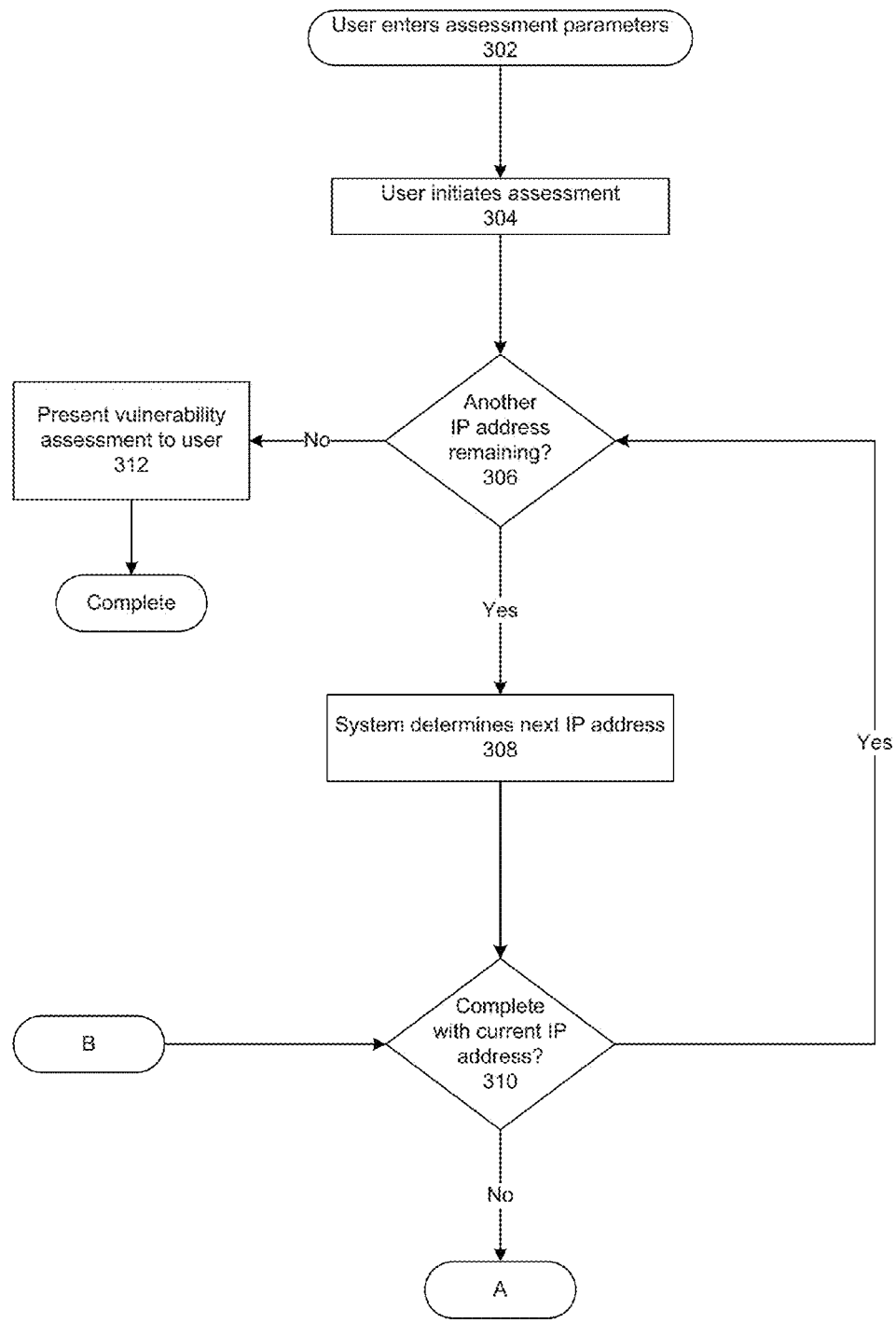
FIGS. 3a-3d are a flowchart that illustrates a process flow corresponding to the method of FIG. 1.
Figure 3B:
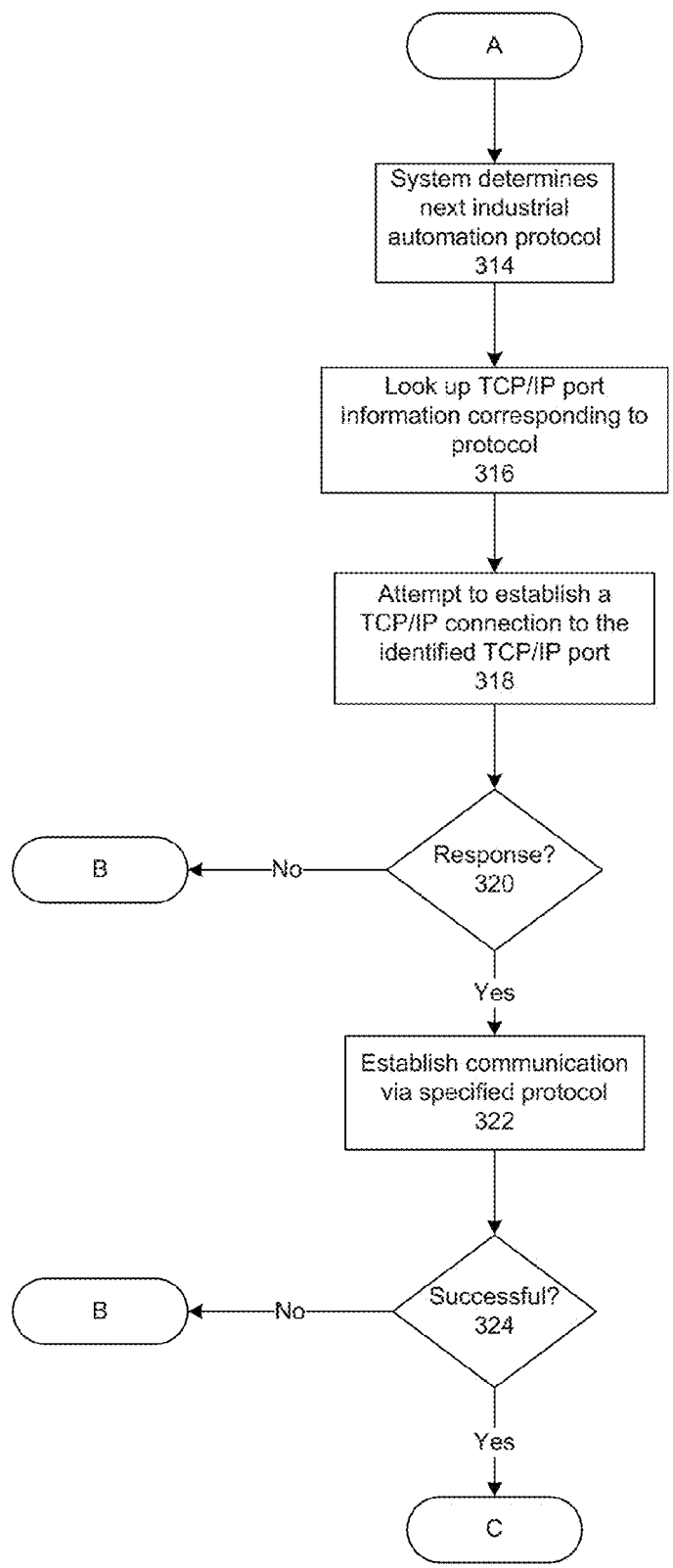
Figure 3C:
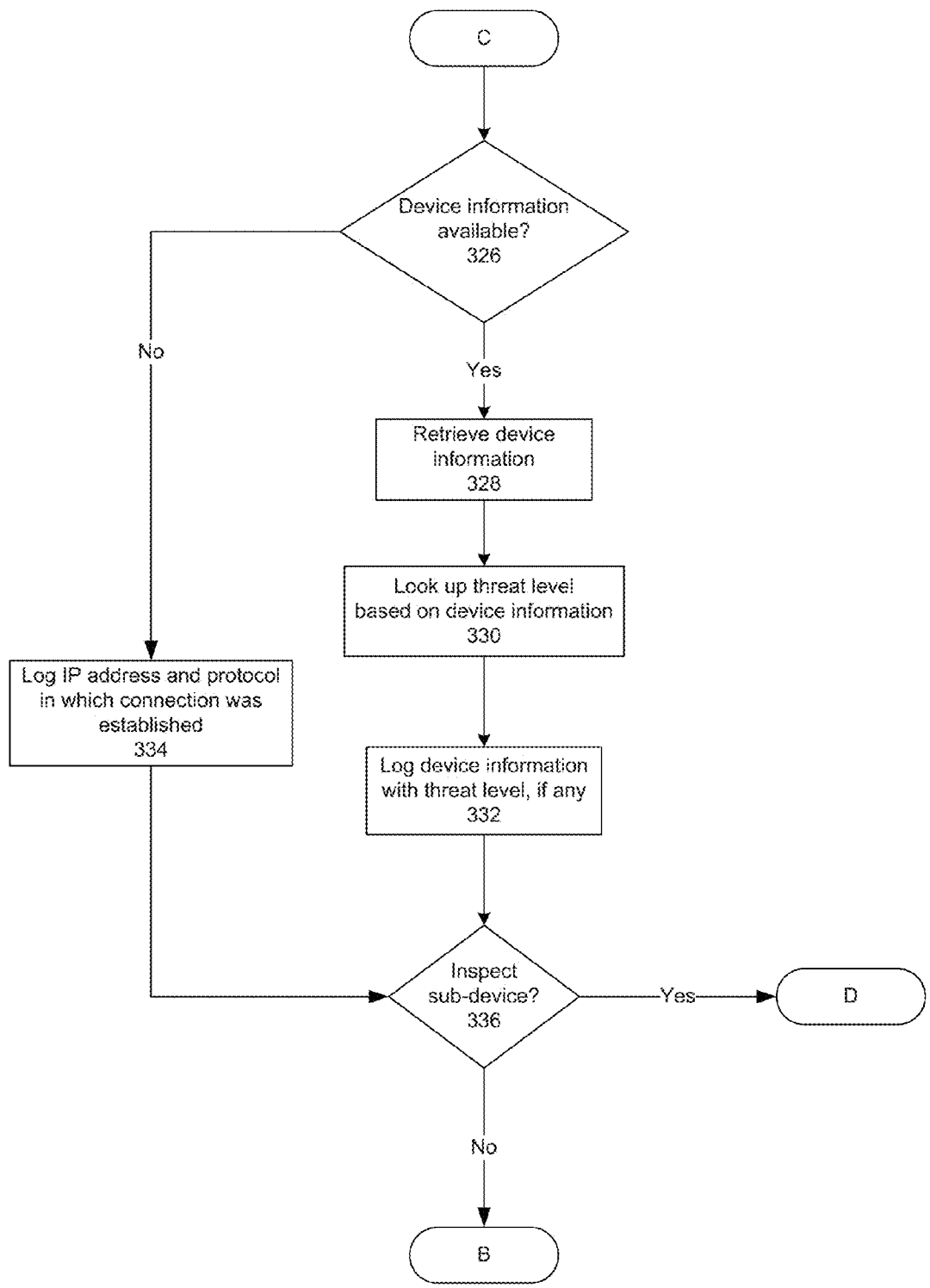
Figure 3D:
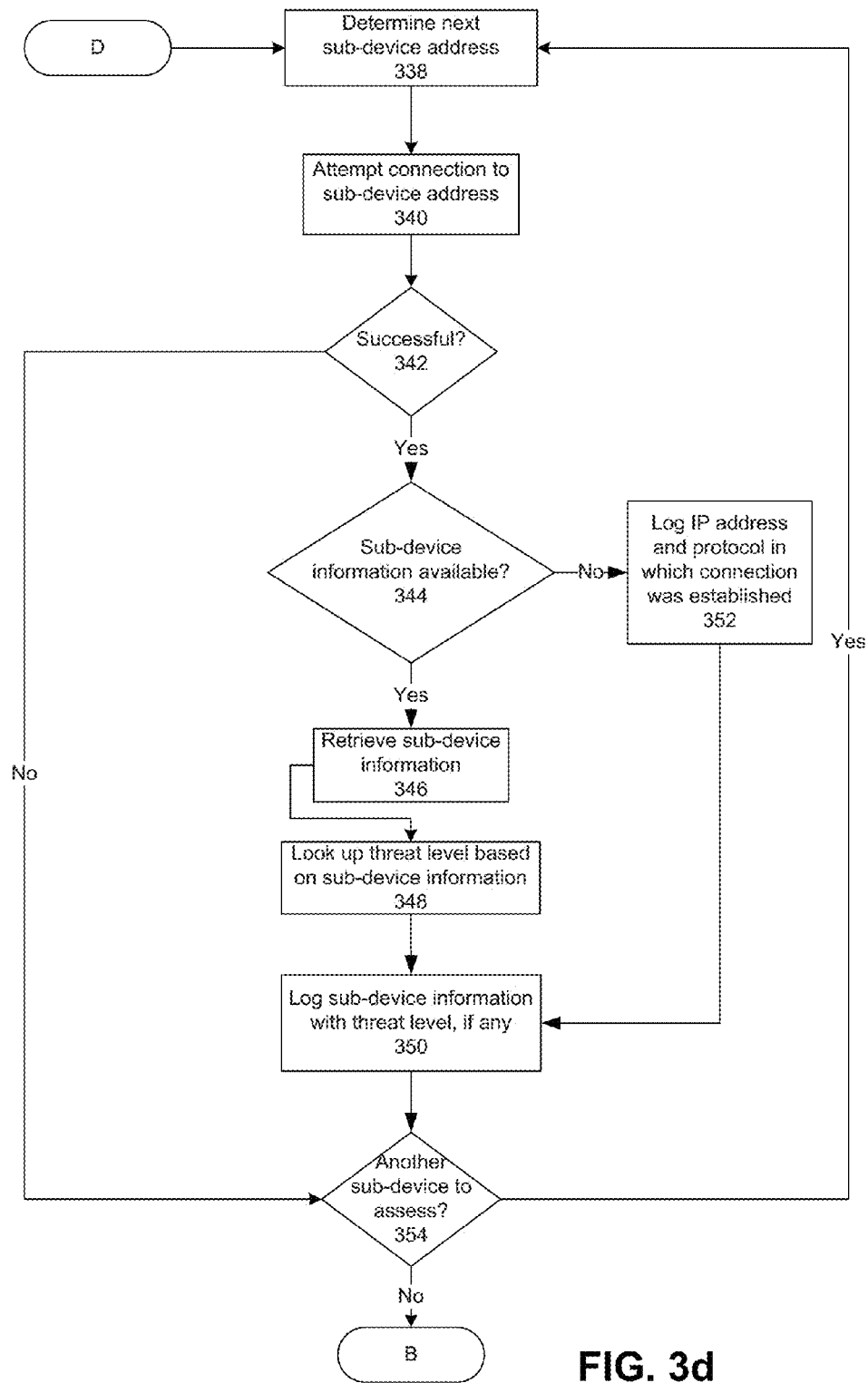

FIG. 2 illustrates an example of a network of industrial automation devices connected to a vulnerability assessment system 200 according to one embodiment of the invention. As a person skilled in the art would understand, the system 200 may be constructed in other ways within the scope of the present invention. The methods of FIGS. 1 and 3a-5b may be implemented in other systems, and the invention is not limited to system 200.

In the preferred embodiment, the vulnerability assessment system 200 is a computer 205 running a vulnerability assessment application 210 that performs the steps illustrated in FIGS. 1 and 3a-5b. The computer 205 may be a desktop, laptop, mobile device, etc. The vulnerability assessment application 210 may be web-based or a dedicated application. The computer 205 is operatively connected to one or more cloud-based vulnerability databases 215, which stores, among other things, the mapping between industrial automation devices and associated threat levels. A person skilled in the art would understand that one or more vulnerability databases may be connected locally to computer 205.

The vulnerability assessment system 200 connects to a plurality of industrial automation devices via a network 220, which may be public (e.g., a wide area network (WAN)) or private (e.g., a local area network (LAN)). The industrial automation devices may include a plurality of different types of devices where devices that are not inherently network-enabled may be connected to the network via a gateway. For example, as seen in FIG. 2, the connected industrial automation devices include gateway device 225, which has ATS 230a, pump 230b, and utility meter 230c as sub-devices, network-enabled equipment (e.g., utility meter, ATS, etc.) 235, SCADA computer/system (OPC, OPC UA) 240, which has gateway device 245, ATS 250a, pump 250b, and utility meter 250c as sub-devices, and building automation gateway 255, which has boiler 260a, chiller 260b, and thermal device 260c as sub-devices. The vulnerability assessment application 210 performs a vulnerability assessment on each of the industrial automation devices that are connected to the network 220 regardless of the device type.

FIGS. 3a-3d illustrate a vulnerability assessment process flow on a plurality of industrial automation devices using a plurality of industrial automation protocols. To begin, a user enters one or more assessment parameters and initiates a vulnerability assessment (steps 302, 304). In the preferred embodiment, the assessment parameters include an IP address range, which specify the devices upon which the vulnerability assessment is to be performed, and industrial automation protocols, which are to be applied to the industrial automation network to perform the vulnerability assessment. The system then performs the vulnerability assessment on each IP address within the range of selected IP addresses (entered by the user in step 302) until all IP addresses are complete (steps 306, 308, 310). When the vulnerability assessment has been performed on each IP address within the range of selected IP addresses, the vulnerability assessment is then presented to the user (step 312).

For each IP address, the system tests the vulnerabilities of each of the selected industrial automation protocols (entered by the user in step 302) before proceeding to the next IP address (step 314). For each industrial automation protocol, the system first determines which TCP/IP port corresponds to the protocol (step 316). For example, as mentioned previously, the TCP/IP port associated with the Modbus protocol is 502, whereas the TCP/IP port associated with the OPC protocol is 135. While this process is described with respect to TCP/IP ports, the same method could be applied to virtual ports associated with other communication protocols.

The system then attempts to connect to the device in three stages using the industrial automation protocol. For each stage, if the connection is successful, the assessment proceeds to the next stage. If the connection is not successful, the assessment moves on to the next protocol until all protocols are completed with the current IP address (step 310). Regardless of success or failure, the system logs the response to the attempted connection.

In the first stage, an attempt is made to establish a TCP/IP connection to the identified TCP/IP port (step 318). Attempting to establish a TCP/IP connection to a TCP/IP port is the conceptual equivalent to "pinging" the TCP/IP port for a response. In the second stage, an attempt is made to establish communication with the TCP/IP port via the specified protocol (step 322). In the third stage, the system sends a read request for device information (e.g., manufacturer and model) by determining whether device information is available and, if so, retrieving the device information from the TCP/IP port via the specified protocol (steps 326, 328). If device information is not available, the system logs the IP address and protocol in which the connection was established (step 334).

Once device information has been retrieved, the system determines the threat level of the device by looking up the mapping between the device and the threat level in the data store and logging the device information with the threat level, if available, in the assessment log (steps 330, 332). As mentioned previously, the mapping between the device and the threat level may be stored locally in a database or may be retrieved from and external system via a web service (or other) request. In one embodiment, the mapping between industrial automation devices and associated threat levels is stored in a table.

For some protocols, after attempting to read device information from the primary device, the system checks to see if there are any sub-devices connected to the primary device in order to perform the industrial automation protocol on any sub-devices (step 336). If there are sub-devices, the system determines the next sub-device address and attempts to connect to the sub-device address (steps 338, 340). If the connection is successful, the system sends a read request for device information (e.g., manufacturer and model) from the sub-device by determining whether device information is available and, if so, retrieving the device information from the TCP/IP port via the specified protocol (steps 342, 344, 346). If not successful, the system checks whether there are any more sub-devices to assess or if no device information is available, the system logs the IP address and protocol in which the connection was established (steps 352, 354).

Otherwise, the system determines the threat level of the sub-device by looking up the mapping between the sub-device and the threat level in the data store and logging the sub-device information with the threat level, if available, in the assessment log (steps 348, 350). If there are additional sub-devices to assess, the system determines the next sub-device address and repeats the cycle (step 338).

Figure 4:
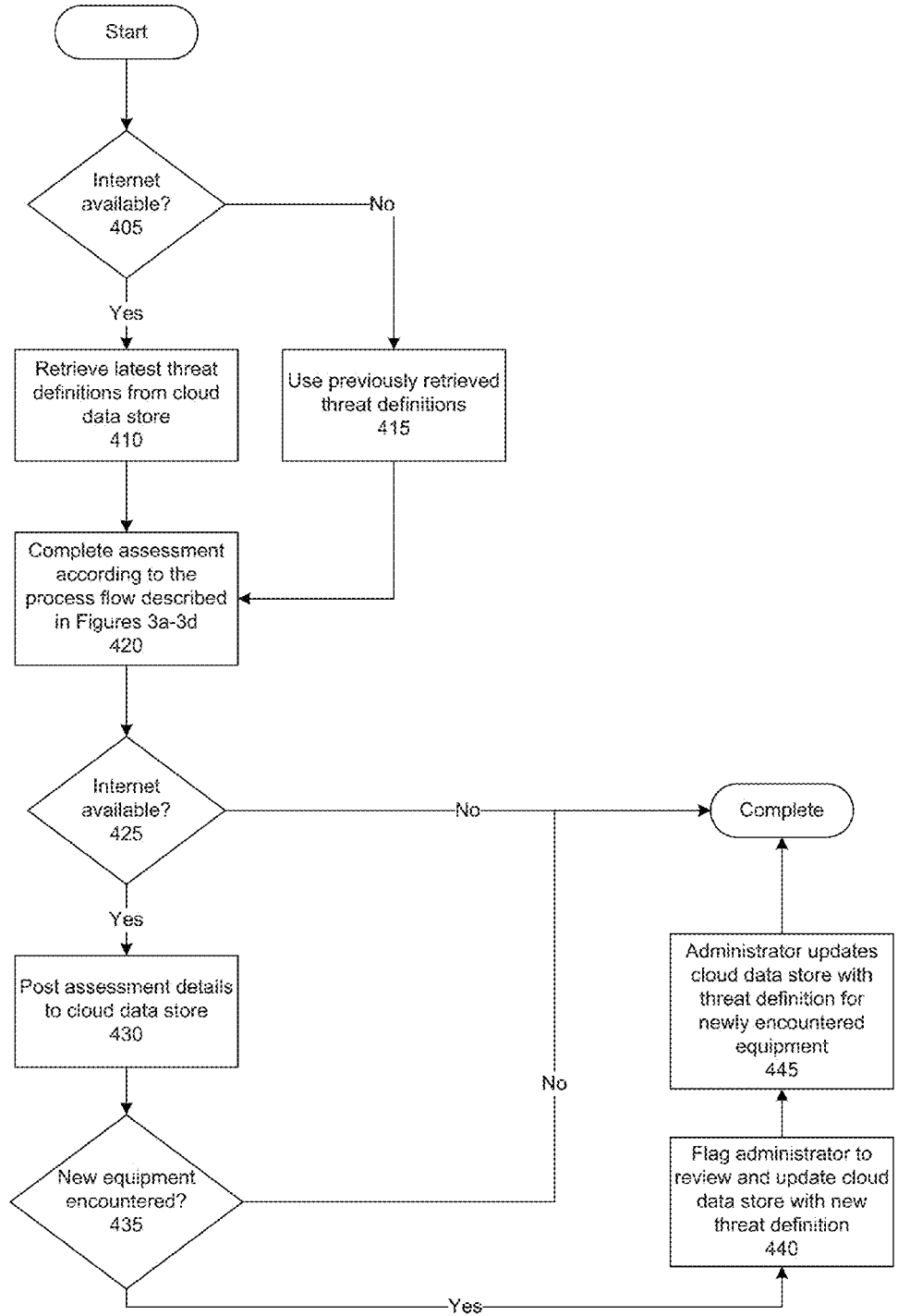
FIG. 4 is a flowchart that illustrates a process flow corresponding to another embodiment of the invention.

FIG. 4 illustrates another embodiment of the invention in which the system updates the threat definitions in the cloud data store when new equipment is encountered. If the Internet is available prior to performing the assessment, then the latest threat definitions are retrieved from the cloud data store (steps 405, 410). If the Internet is not available, the system uses the previously retrieved threat definitions (step 415). The assessment is then completed according to the process flow described in FIGS. 3a-3d (step 420). If the Internet is available after completing the assessment, the system posts assessment details to the cloud data store and checks whether any new equipment has been encountered that is not currently listed in the cloud data store (steps 425, 430, 435). If new equipment has been encountered, the new equipment is flagged in the cloud data store for review and update with new threat definitions (step 440). A system administrator then updates the cloud data store with threat definitions for any newly encountered equipment so that the updated threat definitions would be available for any future downloads (step 445).

Figure 5A:
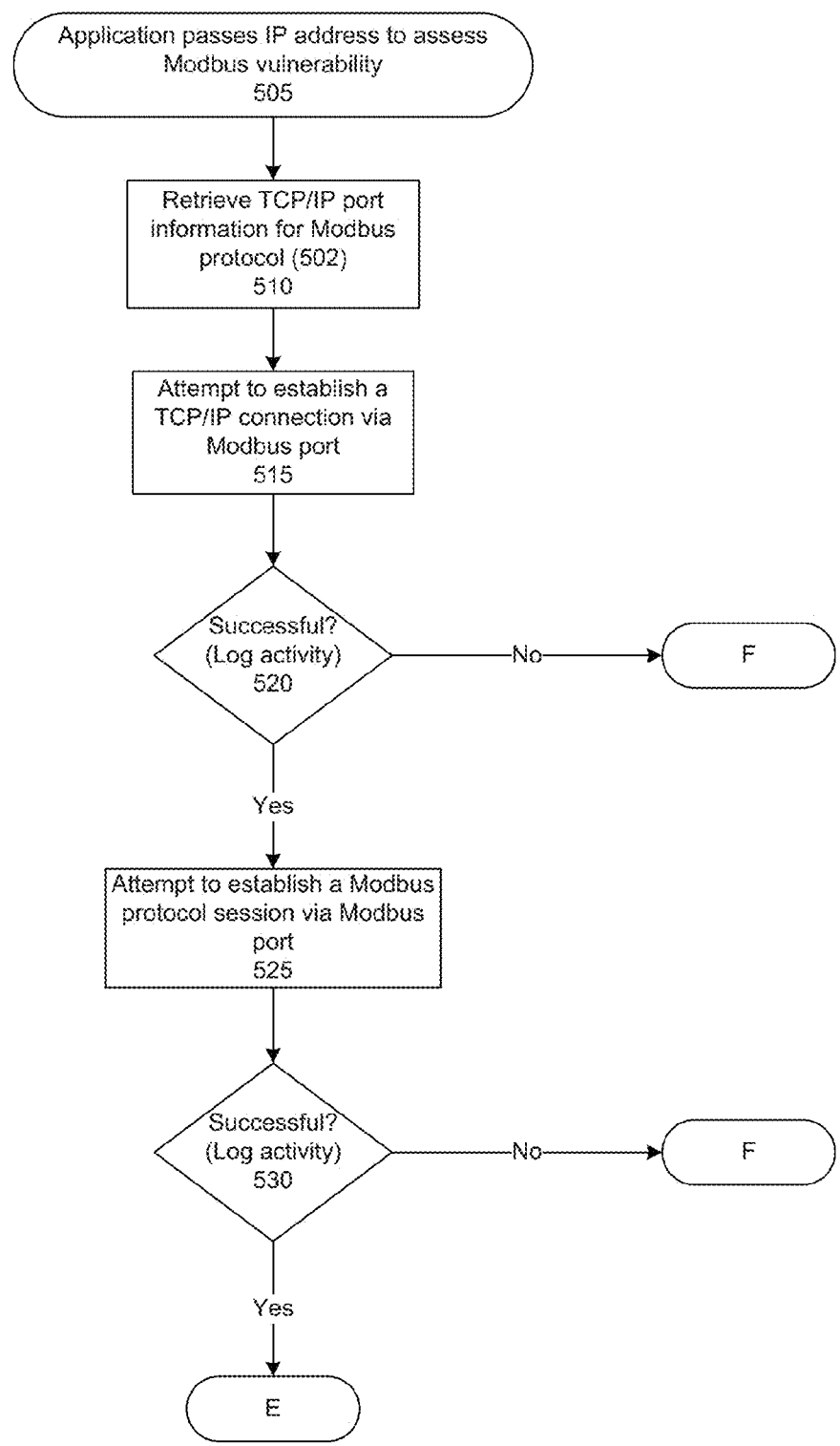
FIGS. 5a-5b are a flowchart that illustrates a process flow corresponding to one embodiment of the invention.
Figure 5B:
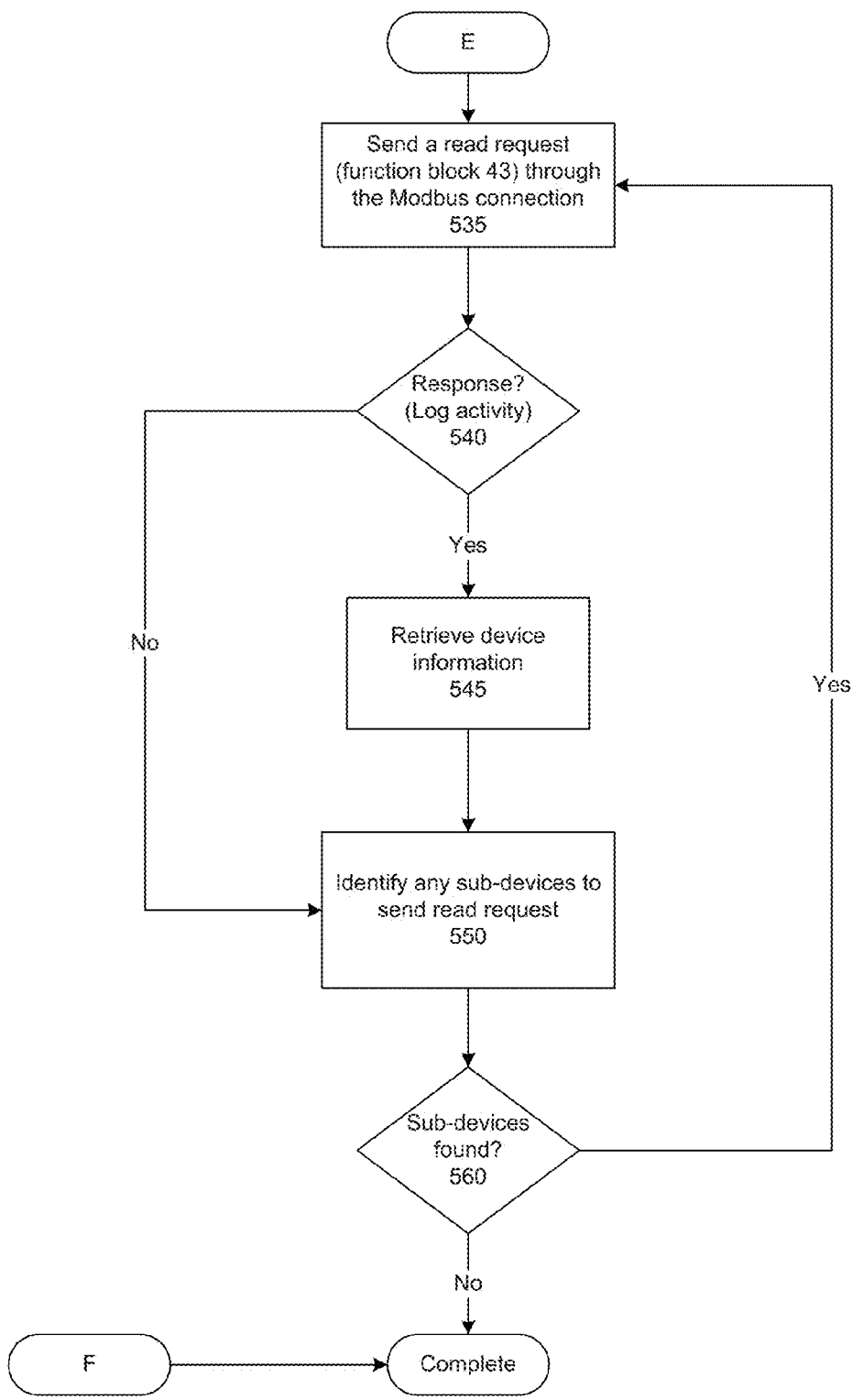

FIGS. 5a-5b illustrate an example of how the system attempts to communicate with one device with respect to one protocol (i.e., the Modbus protocol). An application passes an IP address to assess whether a device has Modbus vulnerability (step 505). The system retrieves TCP/IP port information for the Modbus protocol (i.e., port 502), attempts to establish a TCP/IP connection via the Modbus port, and logs whether or not the connection was successful (steps 510, 515, 520). If the connection was successful, the system attempts to establish a Modbus protocol session via the Modbus port and again logs whether or not the session was successfully established (steps 525, 530). If the session was successfully established, the system sends a read request (function block 43) through the Modbus connection and logs the response, if any (steps 535, 540). If the read request was successful, the device information (e.g., manufacturer, model, and revision) is retrieved (step 545). The system then identifies whether there are any additional sub-devices to send a read request (step 550). If so, the system sends a read request through the Modbus connection to any additional sub-devices before completing the assessment (step 535, 560).

Figure 6:
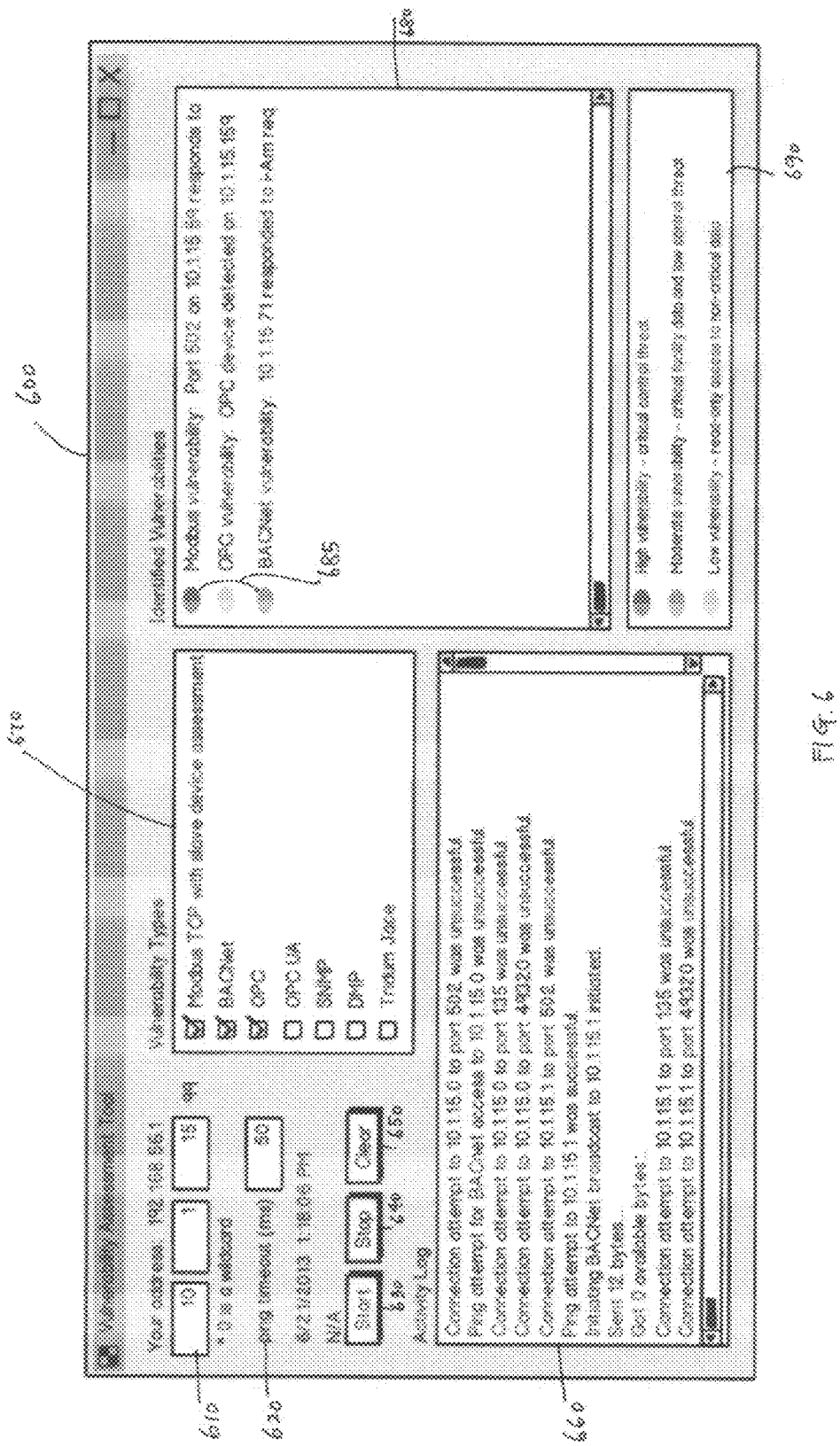
FIG. 6 is a screenshot of an exemplary user interface in a vulnerability assessment system according to one embodiment of the invention.

FIG. 6 illustrates a screenshot of an exemplary user interface according to the present invention. The user interface may be displayed in a web browser, which receives a webpage, or information necessary to display a webpage, from the vulnerability assessment system. Alternately, the user interface may be displayed in a dedicated application in communication with the vulnerability assessment system. A person skilled in the art would understand that the present invention may be embodied on other user interfaces having more or less functionality within the scope of the present invention. As such, FIG. 6 is intended to be illustrative and not limiting in any way.

FIG. 6 illustrates a vulnerability assessment tool user interface 600. In order to perform the vulnerability assessment, the user designates an IP address range 610 and selects the industrial automation protocols 670 with which the vulnerability assessment will be performed. As seen in this particular example, the user has selected the industrial automation protocols Modbus, BACNet, and OPC. The user may also designate a duration (i.e., "ping timeout" 620) that the system will continue to attempt to connect with each device within the IP address range before moving on to another protocol or to another device. In other embodiments, this duration may be designated by default.

The user can control the vulnerability assessment by pressing the start button 630, the stop button 640, and the clear button 650. The vulnerability assessment produces an activity log 660 (see also Example Vulnerability Assessment Log Data included below), which is a record of every connection attempt (e.g., a TCP/IP connection attempt, specific protocol connection attempt, read request attempt) and its success or failure. The vulnerability assessment then displays the results of any identified vulnerabilities 680, including the specific protocol, IP address and TCP/IP port information associated with the vulnerability. The results also include an assigned threat level 685 (corresponding to the range of threat levels 690) based on the manufacturer and model information of the device as determined by a successful read request.

As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

Example Vulnerability Assessment Log Data

Below is an example of the type of information that is logged during a vulnerability assessment.
Connection attempt to 10.1.15.0 to port 502 was unsuccessful.
Ping attempt for BACnet access to 10.1.15.0 was unsuccessful.
Connection attempt to 10.1.15.0 to port 135 was unsuccessful.
Connection attempt to 10.1.15.0 to port 49320 was unsuccessful.
Connection attempt to 10.1.15.1 to port 502 was unsuccessful.
Ping attempt to 10.1.15.1 was successful.
Initiating BACNet broadcast to 10.1.15.1 initiated.
Sent 12 bytes . . . .
Got 0 available bytes . . . .
Connection attempt to 10.1.15.1 to port 135 was unsuccessful.
Connection attempt to 10.1.15.1 to port 49320 was unsuccessful.
Connection attempt to 10.1.15.2 to port 502 was unsuccessful.
Ping attempt for BACnet access to 10.1.15.2 was unsuccessful.
Connection attempt to 10.1.15.2 to port 135 was unsuccessful.
Connection attempt to 10.1.15.2 to port 49320 was unsuccessful.
Connection attempt to 10.1.15.3 to port 502 was unsuccessful.
Ping attempt for BACnet access to 10.1.15.3 was unsuccessful.
Connection attempt to 10.1.15.3 to port 135 was unsuccessful.
Connection attempt to 10.1.15.3 to port 49320 was unsuccessful.
Connection attempt to 10.1.15.4 to port 502 was unsuccessful.
Ping attempt for BACnet access to 10.1.15.4 was unsuccessful.
Connection attempt to 10.1.15.4 to port 135 was unsuccessful.
Connection attempt to 10.1.15.4 to port 49320 was unsuccessful.
Connection attempt to 10.1.15.5 to port 502 was unsuccessful.
Ping attempt for BACnet access to 10.1.15.5 was unsuccessful.
Connection attempt to 10.1.15.5 to port 135 was unsuccessful.
Connection attempt to 10.1.15.5 to port 49320 was unsuccessful.
Connection attempt to 10.1.15.6 to port 502 was unsuccessful.
Ping attempt for BACnet access to 10.1.15.6 was unsuccessful.
Connection attempt to 10.1.15.6 to port 135 was unsuccessful.
Connection attempt to 10.1.15.6 to port 49320 was unsuccessful.
Connection attempt to 10.1.15.7 to port 502 was unsuccessful.
Ping attempt for BACnet access to 10.1.15.7 was unsuccessful.
Connection attempt to 10.1.15.7 to port 135 was unsuccessful.
Connection attempt to 10.1.15.7 to port 49320 was unsuccessful.
Connection attempt to 10.1.15.8 to port 502 was unsuccessful.
Ping attempt for BACnet access to 10.1.15.8 was unsuccessful.
Connection attempt to 10.1.15.8 to port 135 was unsuccessful.
Connection attempt to 10.1.15.8 to port 49320 was unsuccessful.
Connection attempt to 10.1.15.9 to port 502 was unsuccessful.
Ping attempt for BACnet access to 10.1.15.9 was unsuccessful.

Connection attempt to 10.1.15.9 to port 135 was unsuccessful.
Connection attempt to 10.1.15.9 to port 49320 was unsuccessful.
Connection attempt to 10.1.15.10 to port 502 was unsuccessful.
Ping attempt for BACnet access to 10.1.15.10 was unsuccessful.
Connection attempt to 10.1.15.10 to port 135 was unsuccessful.
Connection attempt to 10.1.15.10 to port 49320 was unsuccessful.
Connection attempt to 10.1.15.11 to port 502 was unsuccessful.
Ping attempt for BACnet access to 10.1.15.11 was unsuccessful.
Connection attempt to 10.1.15.11 to port 135 was unsuccessful.
Connection attempt to 10.1.15.11 to port 49320 was unsuccessful.
Connection attempt to 10.1.15.12 to port 502 was unsuccessful.
Ping attempt for BACnet access to 10.1.15.12 was unsuccessful.
Connection attempt to 10.1.15.12 to port 135 was unsuccessful.
Connection attempt to 10.1.15.12 to port 49320 was unsuccessful.
Connection attempt to 10.1.15.13 to port 502 was unsuccessful.
Ping attempt for BACnet access to 10.1.15.13 was unsuccessful.
Connection attempt to 10.1.15.13 to port 135 was unsuccessful.
Connection attempt to 10.1.15.13 to port 49320 was unsuccessful.
Connection attempt to 10.1.15.14 to port 502 was unsuccessful.
Ping attempt for BACnet access to 10.1.15.14 was unsuccessful.
Connection attempt to 10.1.15.14 to port 135 was unsuccessful.
Connection attempt to 10.1.15.14 to port 49320 was unsuccessful.
Connection attempt to 10.1.15.15 to port 502 was unsuccessful.
Ping attempt for BACnet access to 10.1.15.15 was unsuccessful.
Connection attempt to 10.1.15.15 to port 135 was unsuccessful.
Connection attempt to 10.1.15.15 to port 49320 was unsuccessful.
Connection attempt to 10.1.15.16 to port 502 was unsuccessful.
Ping attempt for BACnet access to 10.1.15.16 was unsuccessful.
Connection attempt to 10.1.15.16 to port 135 was unsuccessful.
Connection attempt to 10.1.15.16 to port 49320 was unsuccessful.
Connection attempt to 10.1.15.17 to port 502 was unsuccessful.
Ping attempt for BACnet access to 10.1.15.17 was unsuccessful.
Connection attempt to 10.1.15.17 to port 135 was unsuccessful.
Connection attempt to 10.1.15.17 to port 49320 was unsuccessful.
Connection attempt to 10.1.15.18 to port 502 was unsuccessful.
Ping attempt for BACnet access to 10.1.15.18 was unsuccessful.
Connection attempt to 10.1.15.18 to port 135 was unsuccessful.
Connection attempt to 10.1.15.18 to port 49320 was unsuccessful.
Connection attempt to 10.1.15.19 to port 502 was unsuccessful.
Ping attempt for BACnet access to 10.1.15.19 was unsuccessful.
Connection attempt to 10.1.15.19 to port 135 was unsuccessful.
Connection attempt to 10.1.15.19 to port 49320 was unsuccessful.
Connection attempt to 10.1.15.20 to port 502 was unsuccessful.
Ping attempt for BACnet access to 10.1.15.20 was unsuccessful.
Connection attempt to 10.1.15.20 to port 135 was unsuccessful.
Connection attempt to 10.1.15.20 to port 49320 was unsuccessful.
Connection attempt to 10.1.15.21 to port 502 was unsuccessful.
Ping attempt for BACnet access to 10.1.15.21 was unsuccessful.
Connection attempt to 10.1.15.21 to port 135 was unsuccessful.
Connection attempt to 10.1.15.21 to port 49320 was unsuccessful.
Connection attempt to 10.1.15.22 to port 502 was unsuccessful.
Ping attempt for BACnet access to 10.1.15.22 was unsuccessful.
Connection attempt to 10.1.15.22 to port 135 was unsuccessful.
Connection attempt to 10.1.15.22 to port 49320 was unsuccessful.
Connection attempt to 10.1.15.23 to port 502 was unsuccessful.
Ping attempt for BACnet access to 10.1.15.23 was unsuccessful.
Connection attempt to 10.1.15.23 to port 135 was unsuccessful.
Connection attempt to 10.1.15.23 to port 49320 was unsuccessful.
Connection attempt to 10.1.15.24 to port 502 was unsuccessful.
Ping attempt for BACnet access to 10.1.15.24 was unsuccessful.
Connection attempt to 10.1.15.24 to port 135 was unsuccessful.
Connection attempt to 10.1.15.24 to port 49320 was unsuccessful.
Connection attempt to 10.1.15.25 to port 502 was unsuccessful.
Ping attempt for BACnet access to 10.1.15.25 was unsuccessful.
Connection attempt to 10.1.15.25 to port 135 was unsuccessful.
Connection attempt to 10.1.15.25 to port 49320 was unsuccessful.

Connection attempt to 10.1.15.26 to port 502 was unsuccessful.
Ping attempt for BACnet access to 10.1.15.26 was unsuccessful.
Connection attempt to 10.1.15.26 to port 135 was unsuccessful.
Connection attempt to 10.1.15.26 to port 49320 was unsuccessful.
Connection attempt to 10.1.15.27 to port 502 was unsuccessful.
Ping attempt for BACnet access to 10.1.15.27 was unsuccessful.
Connection attempt to 10.1.15.27 to port 135 was unsuccessful.
Connection attempt to 10.1.15.27 to port 49320 was unsuccessful.
Connection attempt to 10.1.15.28 to port 502 was unsuccessful.
Ping attempt for BACnet access to 10.1.15.28 was unsuccessful.
Connection attempt to 10.1.15.28 to port 135 was unsuccessful.
Connection attempt to 10.1.15.28 to port 49320 was unsuccessful.
Connection attempt to 10.1.15.29 to port 502 was unsuccessful.
Ping attempt for BACnet access to 10.1.15.29 was unsuccessful.
Connection attempt to 10.1.15.29 to port 135 was unsuccessful.
Connection attempt to 10.1.15.29 to port 49320 was unsuccessful.
Connection attempt to 10.1.15.30 to port 502 was unsuccessful.
Ping attempt for BACnet access to 10.1.15.30 was unsuccessful.
Connection attempt to 10.1.15.30 to port 135 was unsuccessful.
Connection attempt to 10.1.15.30 to port 49320 was unsuccessful.
Connection attempt to 10.1.15.31 to port 502 was unsuccessful.
Ping attempt for BACnet access to 10.1.15.31 was unsuccessful.
Connection attempt to 10.1.15.31 to port 135 was unsuccessful.
Connection attempt to 10.1.15.31 to port 49320 was unsuccessful.
Connection attempt to 10.1.15.32 to port 502 was unsuccessful.
Ping attempt for BACnet access to 10.1.15.32 was unsuccessful.
Connection attempt to 10.1.15.32 to port 135 was unsuccessful.
Connection attempt to 10.1.15.32 to port 49320 was unsuccessful.
Connection attempt to 10.1.15.33 to port 502 was unsuccessful.
Ping attempt for BACnet access to 10.1.15.33 was unsuccessful.
Connection attempt to 10.1.15.33 to port 135 was unsuccessful.
Connection attempt to 10.1.15.33 to port 49320 was unsuccessful.
Connection attempt to 10.1.15.34 to port 502 was unsuccessful.
Ping attempt for BACnet access to 10.1.15.34 was unsuccessful.
Connection attempt to 10.1.15.34 to port 135 was unsuccessful.
Connection attempt to 10.1.15.34 to port 49320 was unsuccessful.
Connection attempt to 10.1.15.35 to port 502 was unsuccessful.
Ping attempt for BACnet access to 10.1.15.35 was unsuccessful.
Connection attempt to 10.1.15.35 to port 135 was unsuccessful.
Connection attempt to 10.1.15.35 to port 49320 was unsuccessful.
Connection attempt to 10.1.15.36 to port 502 was unsuccessful.
Ping attempt for BACnet access to 10.1.15.36 was unsuccessful.
Connection attempt to 10.1.15.36 to port 135 was unsuccessful.
Connection attempt to 10.1.15.36 to port 49320 was unsuccessful.
Connection attempt to 10.1.15.37 to port 502 was unsuccessful.
Ping attempt for BACnet access to 10.1.15.37 was unsuccessful.
Connection attempt to 10.1.15.37 to port 135 was unsuccessful.
Connection attempt to 10.1.15.37 to port 49320 was unsuccessful.
Connection attempt to 10.1.15.38 to port 502 was unsuccessful.
Ping attempt for BACnet access to 10.1.15.38 was unsuccessful.
Connection attempt to 10.1.15.38 to port 135 was unsuccessful.
Connection attempt to 10.1.15.38 to port 49320 was unsuccessful.
Connection attempt to 10.1.15.39 to port 502 was unsuccessful.
Ping attempt for BACnet access to 10.1.15.39 was unsuccessful.
Connection attempt to 10.1.15.39 to port 135 was unsuccessful.
Connection attempt to 10.1.15.39 to port 49320 was unsuccessful.
Connection attempt to 10.1.15.40 to port 502 was unsuccessful.
Ping attempt for BACnet access to 10.1.15.40 was unsuccessful.
Connection attempt to 10.1.15.40 to port 135 was unsuccessful.
Connection attempt to 10.1.15.40 to port 49320 was unsuccessful.
Connection attempt to 10.1.15.41 to port 502 was unsuccessful.
Ping attempt for BACnet access to 10.1.15.41 was unsuccessful.
Connection attempt to 10.1.15.41 to port 135 was unsuccessful.
Connection attempt to 10.1.15.41 to port 49320 was unsuccessful.
Connection attempt to 10.1.15.42 to port 502 was unsuccessful.
Ping attempt for BACnet access to 10.1.15.42 was unsuccessful.

Connection attempt to 10.1.15.42 to port 135 was unsuccessful.
Connection attempt to 10.1.15.42 to port 49320 was unsuccessful.
Connection attempt to 10.1.15.43 to port 502 was unsuccessful.
Ping attempt for BACnet access to 10.1.15.43 was unsuccessful.
Connection attempt to 10.1.15.43 to port 135 was unsuccessful.
Connection attempt to 10.1.15.43 to port 49320 was unsuccessful.
Connection attempt to 10.1.15.44 to port 502 was unsuccessful.
Ping attempt for BACnet access to 10.1.15.44 was unsuccessful.
Connection attempt to 10.1.15.44 to port 135 was unsuccessful.
Connection attempt to 10.1.15.44 to port 49320 was unsuccessful.
Connection attempt to 10.1.15.45 to port 502 was unsuccessful.
Ping attempt for BACnet access to 10.1.15.45 was unsuccessful.
Connection attempt to 10.1.15.45 to port 135 was unsuccessful.
Connection attempt to 10.1.15.45 to port 49320 was unsuccessful.
Connection attempt to 10.1.15.46 to port 502 was unsuccessful.
Ping attempt for BACnet access to 10.1.15.46 was unsuccessful.
Connection attempt to 10.1.15.46 to port 135 was unsuccessful.
Connection attempt to 10.1.15.46 to port 49320 was unsuccessful.
Connection attempt to 10.1.15.47 to port 502 was unsuccessful.
Ping attempt for BACnet access to 10.1.15.47 was unsuccessful.
Connection attempt to 10.1.15.47 to port 135 was unsuccessful.
Connection attempt to 10.1.15.47 to port 49320 was unsuccessful.
Connection attempt to 10.1.15.48 to port 502 was unsuccessful.
Ping attempt for BACnet access to 10.1.15.48 was unsuccessful.
Connection attempt to 10.1.15.48 to port 135 was unsuccessful.
Connection attempt to 10.1.15.48 to port 49320 was unsuccessful.
Connection attempt to 10.1.15.49 to port 502 was unsuccessful.
Ping attempt for BACnet access to 10.1.15.49 was unsuccessful.
Connection attempt to 10.1.15.49 to port 135 was unsuccessful.
Connection attempt to 10.1.15.49 to port 49320 was unsuccessful.
Connection attempt to 10.1.15.50 to port 502 was unsuccessful.
Ping attempt for BACnet access to 10.1.15.50 was unsuccessful.
Connection attempt to 10.1.15.50 to port 135 was unsuccessful.
Connection attempt to 10.1.15.50 to port 49320 was unsuccessful.
Connection attempt to 10.1.15.51 to port 502 was unsuccessful.
Ping attempt for BACnet access to 10.1.15.51 was unsuccessful.
Connection attempt to 10.1.15.51 to port 135 was unsuccessful.
Connection attempt to 10.1.15.51 to port 49320 was unsuccessful.
Connection attempt to 10.1.15.52 to port 502 was unsuccessful.
Ping attempt for BACnet access to 10.1.15.52 was unsuccessful.
Connection attempt to 10.1.15.52 to port 135 was unsuccessful.
Connection attempt to 10.1.15.52 to port 49320 was unsuccessful.
Connection attempt to 10.1.15.53 to port 502 was unsuccessful.
Ping attempt for BACnet access to 10.1.15.53 was unsuccessful.
Connection attempt to 10.1.15.53 to port 135 was unsuccessful.
Connection attempt to 10.1.15.53 to port 49320 was unsuccessful.
Connection attempt to 10.1.15.54 to port 502 was unsuccessful.
Ping attempt to 10.1.15.54 was successful.
Initiating BACNet broadcast to 10.1.15.54 initiated.
Sent 12 bytes . . . .
Got 0 available bytes . . . .
Connection attempt to 10.1.15.54 to port 135 was unsuccessful.
Connection attempt to 10.1.15.54 to port 49320 was unsuccessful.
Connection attempt to 10.1.15.55 to port 502 was unsuccessful.
Ping attempt to 10.1.15.55 was successful.
Initiating BACNet broadcast to 10.1.15.55 initiated.
Sent 12 bytes . . . .
Got 0 available bytes . . . .
Connection attempt to 10.1.15.55 to port 135 was unsuccessful.
Connection attempt to 10.1.15.55 to port 49320 was unsuccessful.
Connection attempt to 10.1.15.56 to port 502 was unsuccessful.
Ping attempt for BACnet access to 10.1.15.56 was unsuccessful.
Connection attempt to 10.1.15.56 to port 135 was unsuccessful.
Connection attempt to 10.1.15.56 to port 49320 was unsuccessful.
Connection attempt to 10.1.15.57 to port 502 was unsuccessful.
Ping attempt to 10.1.15.57 was successful.
Initiating BACNet broadcast to 10.1.15.57 initiated.
Sent 12 bytes . . . .
Got 0 available bytes . . . .
Connection attempt to 10.1.15.57 to port 135 was unsuccessful.
Connection attempt to 10.1.15.57 to port 49320 was unsuccessful.
Connection attempt to 10.1.15.58 to port 502 was unsuccessful.
Ping attempt to 10.1.15.58 was successful.

Initiating BACNet broadcast to 10.1.15.58 initiated.
Sent 12 bytes . . . .
Got 0 available bytes . . . .
Connection attempt to 10.1.15.58 to port 135 was unsuccessful.
Connection attempt to 10.1.15.58 to port 49320 was unsuccessful.
Connection attempt to 10.1.15.59 to port 502 was successful.
Attempting to connect via Modbus to 10.1.15.59 via port 502.
Modbus connection to 10.1.15.59 to port 502 was successful.
Attempting Modbus communication with 10.1.15.59 on slave device id 1.
Attempting Modbus communication with 10.1.15.59 on slave device id 2.
Attempting Modbus communication with 10.1.15.59 on slave device id 3.
Attempting Modbus communication with 10.1.15.59 on slave device id 4.
Attempting Modbus communication with 10.1.15.59 on slave device id 5.
Attempting Modbus communication with 10.1.15.59 on slave device id 6.
Attempting Modbus communication with 10.1.15.59 on slave device id 7.
Attempting Modbus communication with 10.1.15.59 on slave device id 8.
Attempting Modbus communication with 10.1.15.59 on slave device id 9.
Attempting Modbus communication with 10.1.15.59 on slave device id 10.
Attempting Modbus communication with 10.1.15.59 on slave device id 11.
Attempting Modbus communication with 10.1.15.59 on slave device id 12.
Attempting Modbus communication with 10.1.15.59 on slave device id 13.
Attempting Modbus communication with 10.1.15.59 on slave device id 14.
Attempting Modbus communication with 10.1.15.59 on slave device id 15.
Attempting Modbus communication with 10.1.15.59 on slave device id 16.
Attempting Modbus communication with 10.1.15.59 on slave device id 17.
Attempting Modbus communication with 10.1.15.59 on slave device id 18.
Attempting Modbus communication with 10.1.15.59 on slave device id 19.
Attempting Modbus communication with 10.1.15.59 on slave device id 20.
Attempting Modbus communication with 10.1.15.59 on slave device id 21.
Attempting Modbus communication with 10.1.15.59 on slave device id 22.
Attempting Modbus communication with 10.1.15.59 on slave device id 23.
Attempting Modbus communication with 10.1.15.59 on slave device id 24.
Attempting Modbus communication with 10.1.15.59 on slave device id 25.
Attempting Modbus communication with 10.1.15.59 on slave device id 26.
Attempting Modbus communication with 10.1.15.59 on slave device id 27.
Attempting Modbus communication with 10.1.15.59 on slave device id 28.
Attempting Modbus communication with 10.1.15.59 on slave device id 29.
Attempting Modbus communication with 10.1.15.59 on slave device id 30.
Attempting Modbus communication with 10.1.15.59 on slave device id 31.
Attempting Modbus communication with 10.1.15.59 on slave device id 32.
Attempting Modbus communication with 10.1.15.59 on slave device id 33.
Attempting Modbus communication with 10.1.15.59 on slave device id 34.
Attempting Modbus communication with 10.1.15.59 on slave device id 35.
Attempting Modbus communication with 10.1.15.59 on slave device id 36.
Attempting Modbus communication with 10.1.15.59 on slave device id 37.
Attempting Modbus communication with 10.1.15.59 on slave device id 38.
Attempting Modbus communication with 10.1.15.59 on slave device id 39.
Attempting Modbus communication with 10.1.15.59 on slave device id 40.
Attempting Modbus communication with 10.1.15.59 on slave device id 41.
Attempting Modbus communication with 10.1.15.59 on slave device id 42.
Attempting Modbus communication with 10.1.15.59 on slave device id 43.
Attempting Modbus communication with 10.1.15.59 on slave device id 44.
Attempting Modbus communication with 10.1.15.59 on slave device id 45.
Attempting Modbus communication with 10.1.15.59 on slave device id 46.

The invention claimed is:

1. A method, performed by a computer system, for providing a vulnerability assessment of a network of industrial automation devices, the method comprising:
   providing a user interface that enables a user to select an IP address range for a vulnerability assessment and that enables the user to select a plurality of industrial automation protocols with respect to which the vulnerability assessment will be performed;
   attempting to establish a communication session with each device within the selected IP address range, wherein, in response to the user selecting a plurality of industrial automation protocols, an attempt is made using each of the plurality of selected industrial automation protocols in order to identify any vulnerabilities within the IP address range for each of the selected industrial automation protocols;
   in response to being able to establish a communication session with a device, attempting to read manufacturer and model information from the device, wherein, in response to the user selecting a plurality of industrial automation protocols, a read attempt is made for each of the plurality of industrial automation protocols with which the system was successful in using to establish a communication session;
   mapping each of a plurality of industrial automation devices with a threat level;
   storing the mapping in a data store;

in response to reading the manufacturer and model information from the device, determining a threat level associated with the device by looking up the device in the mapping using the manufacturer and model information and, in response to finding the device in the mapping, retrieving the threat level associated with the device;

providing a vulnerability assessment to the user and uploading the vulnerability assessment to the data store, wherein the vulnerability assessment identifies each device with which a communication session was established and, for each identified device, the industrial automation protocol(s) with which the communication session was established and any threat level determined for the device;

determining if the vulnerability assessment includes a new device that is not in the mapping;

in response to the vulnerability assessment including a new device, flagging the new device for review and addition to the mapping;

receiving a threat level associated with the new device; and updating the mapping to include the new device and the associated threat level.

2. The method of claim 1, wherein attempting to establish a communication session with a device comprises:
   (i) retrieving TCP/IP port information associated with one of the selected industrial automation protocols;
   (ii) attempting to establish a TCP/IP connection with the TCP/IP port associated with said one industrial automation protocol;
   (iii) in response to establishing a TCP/IP connection with the TCP/IP port, attempting to establish a communication session via said one industrial automation protocol; and
   repeating steps (i)-(iii) until the steps are performed with each of the selected industrial automation protocols.

3. The method of claim 2, further comprising:
   in response to establishing a communication session with a device via one of the industrial automation protocols, determining whether any sub-devices to the device are detected;
   in response to detecting one or more sub-devices, attempting to establish a communication session with each of the detected sub-devices using the same industrial automation protocol;
   in response to establishing a communication session with a sub-device, reading information related to the manufacturer and model of the sub-device from the sub-device, determining a threat level associated with the sub-device using the manufacturer and model information, and including the sub-device in the threat assessment.

4. The method of claim 1, wherein the plurality of industrial automation protocols from which the user is able to select includes Modbus, BACNet, and OPC.

5. The method of claim 4, wherein the plurality of industrial automation protocols from which the user is able to select further comprises OPC UA, SNMP, DMP, and Tridum Jace.

6. A computer system for providing a vulnerability assessment of a network of industrial automation devices, the system comprising:
   one or more processors;
   one or more memory units coupled to the one or more processors, wherein the one or more memory units store instructions that, when executed by the one or more processors, cause the system to perform the operations of:
      providing a user interface that enables a user to select an IP address range for a vulnerability assessment and that enables the user to select a plurality of industrial automation protocols with respect to which the vulnerability assessment will be performed;
      attempting to establish a communication session with each device within the selected IP address range, wherein, in response to the user selecting a plurality of industrial automation protocols, an attempt is made using each of the plurality of selected industrial automation protocols in order to identify any vulnerabilities within the IP address range for each of the selected industrial automation protocols;
      in response to being able to establish a communication session with a device, attempting to read manufacturer and model information from the device, wherein, in response to the user selecting a plurality of industrial automation protocols, a read attempt is made for each of the plurality of industrial automation protocols with which the system was successful in using to establish a communication session;
      mapping each of a plurality of industrial automation devices with a threat level;
      storing the mapping in a data store;
      in response to reading the manufacturer and model information from the device, determining a threat level associated with the device by looking up the device in the mapping using the manufacturer and model information and, in response to finding the device in the mapping, retrieving the threat level associated with the device;
      providing a vulnerability assessment to the user and uploading the vulnerability assessment to the data store, wherein the vulnerability assessment identifies each device with which a communication session was established and, for each identified device, the industrial automation protocol(s) with which the communication session was established and any threat level determined for the device;
      determining if the vulnerability assessment includes a new device that is not in the mapping;
      in response to the vulnerability assessment including a new device, flagging the new device for review and addition to the mapping;
      receiving a threat level associated with the new device; and
      updating the mapping to include the new device and the associated threat level.

7. A computer program embodied on one or more non-transitory computer-readable media and comprising code that when executed by a computer system, enables the computer system to perform the following method for providing a vulnerability assessment of a network of industrial automation devices, the method comprising:
   providing a user interface that enables a user to select an IP address range for a vulnerability assessment and that enables the user to select a plurality of industrial automation protocols with respect to which the vulnerability assessment will be performed;
   attempting to establish a communication session with each device within the selected IP address range, wherein, in response to the user selecting a plurality of industrial automation protocols, an attempt is made using each of the plurality of selected industrial automation protocols in order to identify any vulnerabilities within the IP address range for each of the selected industrial automation protocols;
   in response to being able to establish a communication session with a device, attempting to read manufacturer and model information from the device, wherein, in response to the user selecting a plurality of industrial automation protocols, a read attempt is made for each of the plurality of industrial automation protocols with which the system was successful in using to establish a communication session;

mapping each of a plurality of industrial automation devices with a threat level;

storing the mapping in a data store;

in response to reading the manufacturer and model information from the device, determining a threat level associated with the device by looking up the device in the mapping using the manufacturer and model information and, in response to finding the device in the mapping, retrieving the threat level associated with the device;

providing a vulnerability assessment to the user and uploading the vulnerability assessment to the data store, wherein the vulnerability assessment identifies each device with which a communication session was established and, for each identified device, the industrial automation protocol(s) with which the communication session was established and any threat level determined for the device;

determining if the vulnerability assessment includes a new device that is not in the mapping;

in response to the vulnerability assessment including a new device, flagging the new device for review and addition to the mapping;

receiving a threat level associated with the new device; and updating the mapping to include the new device and the associated threat level.

8. The computer program of claim 7, wherein attempting to establish a communication session with a device comprises:

(i) retrieving TCP/IP port information associated with one of the selected industrial automation protocols;

(ii) attempting to establish a TCP/IP connection with the TCP/IP port associated with said one industrial automation protocol;

(iii) in response to establishing a TCP/IP connection with the TCP/IP port, attempting to establish a communication session via said one industrial automation protocol; and repeating steps (i)-(iii) until the steps are performed with each of the selected industrial automation protocols.

9. The computer program of claim 8, further comprising:

in response to establishing a communication session with a device via one of the industrial automation protocols, determining whether any sub-devices to the device are detected;

in response to detecting one or more sub-devices, attempting to establish a communication session with each of the detected sub-devices using the same industrial automation protocol;

in response to establishing a communication session with a sub-device, reading information related to the manufacturer and model of the sub-device from the sub-device, determining a threat level associated with the sub-device using the manufacturer and model information, and including the sub-device in the threat assessment.

10. The computer program of claim 7, wherein the plurality of industrial automation protocols from which the user is able to select includes Modbus, BAC Net, and OPC.

11. The computer program of claim 10, wherein the plurality of industrial automation protocols from which the user is able to select further comprises OPC UA, SNMP, DMP, and Tridum Jace.

* * * * *